UNITED STATES PATENT OFFICE.

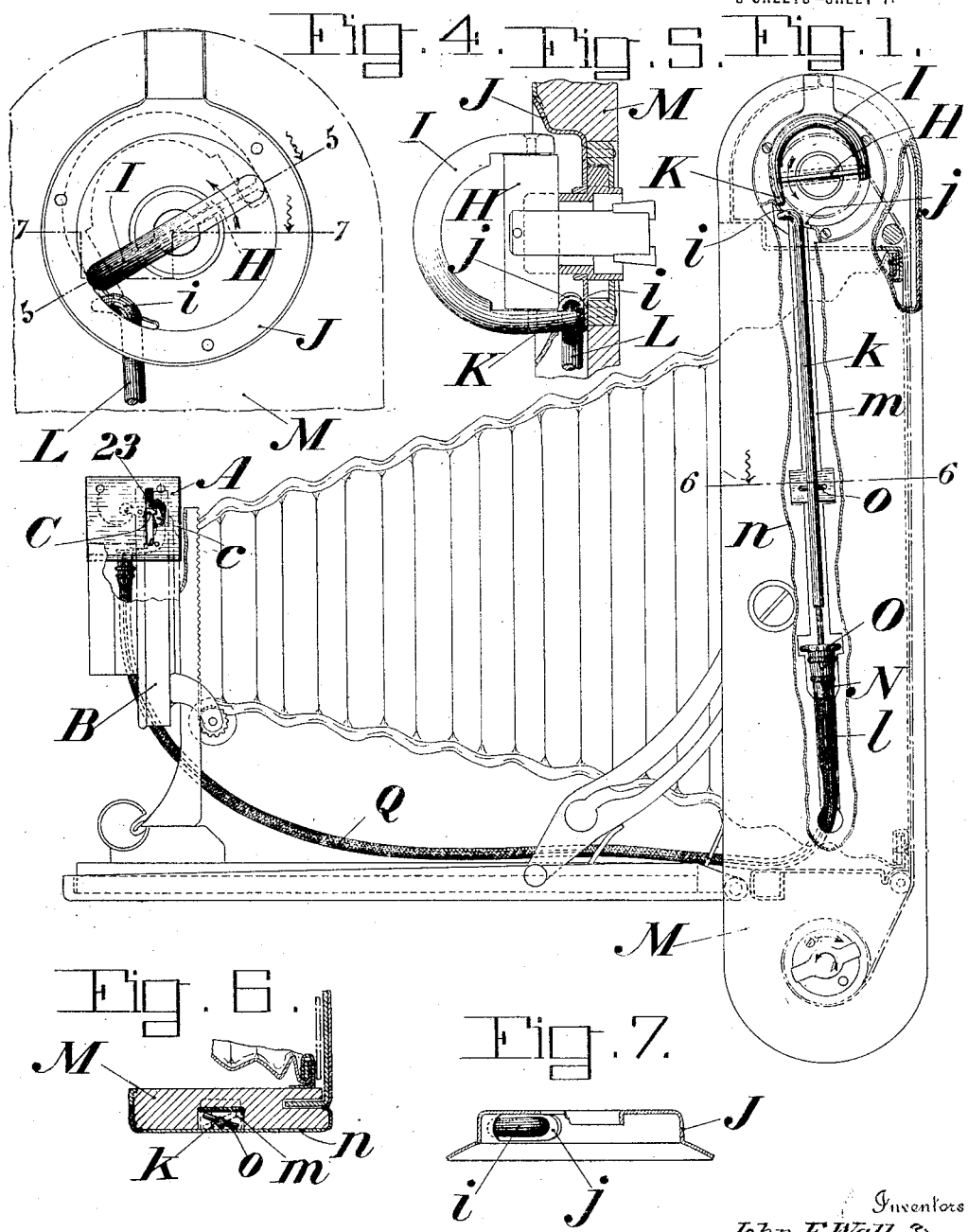

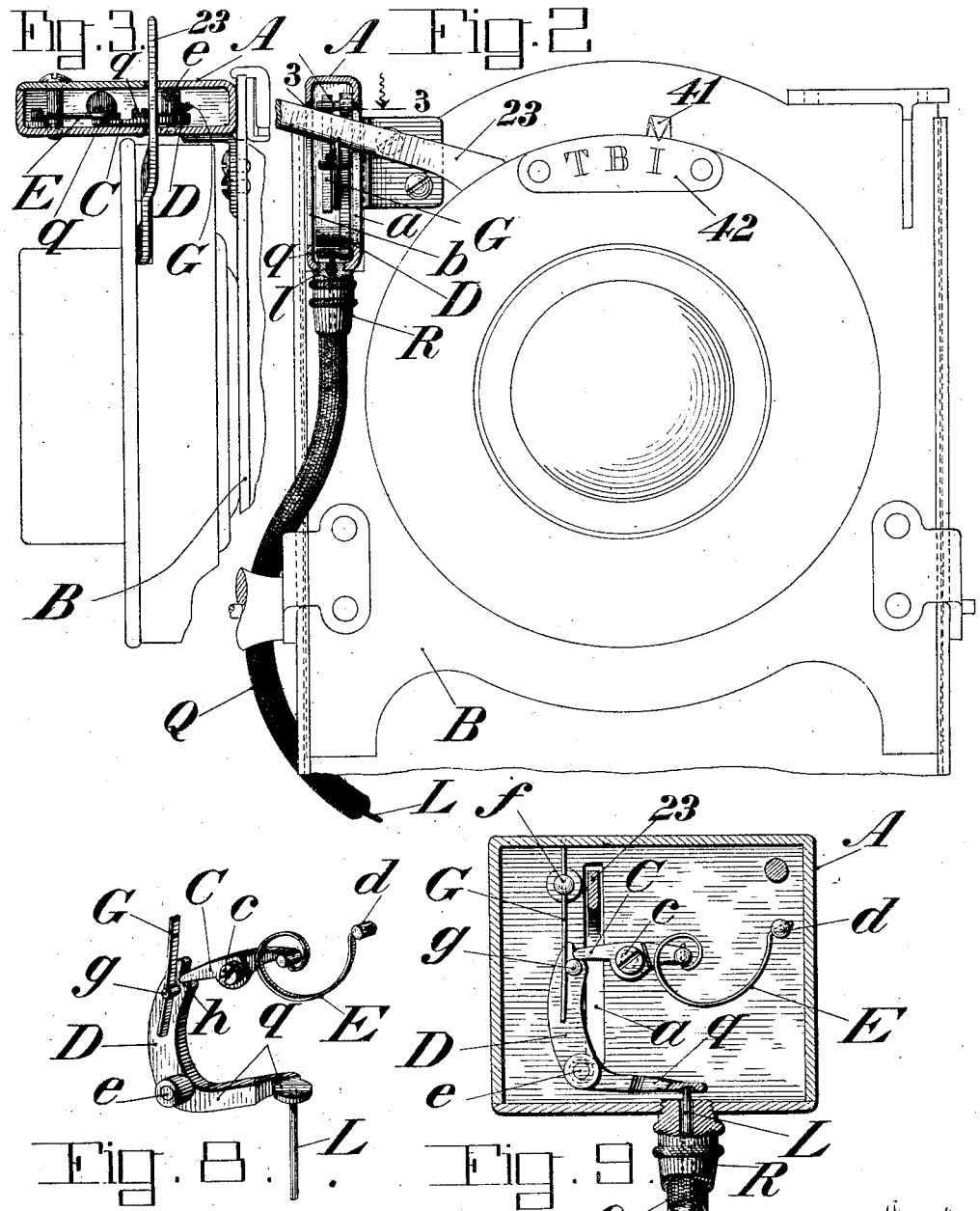

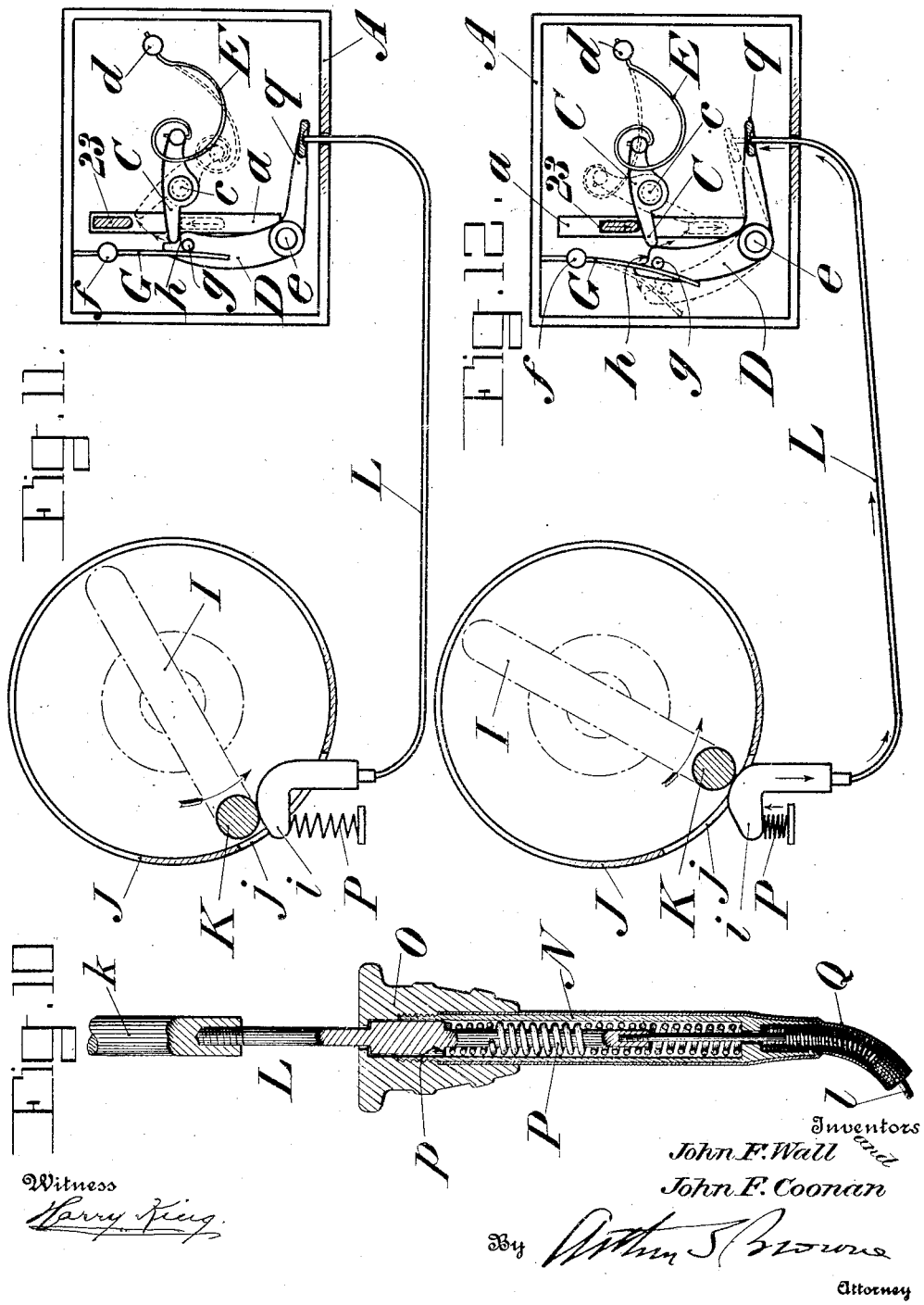

JOHN F. WALL, OF THE UNITED STATES ARMY, AND JOHN F. COONAN, OF BOISE, IDAHO.

PHOTOGRAPHIC CAMERA.

1,362,548.   Specification of Letters Patent.   Patented Dec. 14, 1920.

Application filed April 20, 1920. Serial No. 375,253.

*To all whom it may concern:*

Be it known that we, JOHN F. WALL, a citizen of the United States and an officer of the United States Army, now stationed at Boise, in the county of Ada and State of Idaho, and JOHN F. COONAN, a citizen of the United States, and a resident of Boise, in the county of Ada and State of Idaho, have invented certain new and useful Improvements in Photographic Cameras, of which the following is a specification.

This invention relates to mechanism for photographic cameras to prevent the possibility of making superimposed exposures on a film. To this end the invention consists of a simple locking and unlocking mechanism capable of being readily applied to existing forms of cameras, and which is equally efficient whether making instantaneous, bulb or time exposures.

One embodiment of the present invention applied to a folding camera is shown in the accompanying drawings, wherein—

Figure 1, is a side elevation of the complete mechanism applied to a camera, parts being broken away. Fig. 2, is an enlarged front view partly in vertical section. Fig. 3, is a cross section in the plane indicated by the line 3—3 in Fig. 2. Fig. 4, is an enlarged view of the upper portion of the camera casing showing the winding key and the mechanism controlled thereby. Fig. 5, is a cross section in the plane indicated by the line 5—5 in Fig. 4. Fig. 6, is a detail section of a portion of the camera case on the line 6—6 in Fig. 1. Fig. 7, is a detail section in the plane indicated by the line 7—7 in Fig. 4. Fig. 8, is a perspective view of the locking mechanism detached. Fig. 9 is a vertical longitudinal section of the housing inclosing the locking mechanism. Fig. 10 is an enlarged detail sectional view of the restoring means for the transmitter through which power is applied to unlock the locking mechanism. Figs. 11 and 12 are diagrams illustrating the action of the locking and unlocking mechanism.

The improved mechanism constituting the present invention is shown in the accompanying drawings as applied to a camera in which the shutter mechanism is so organized that it can be used in making "time", "bulb" and "instantaneous" exposures, and the improved mechanism is so organized that it will act with equal efficiency whichever character of exposure is made. Shutter mechanism so organized that it can be adjusted to make any one of these three characters of exposure is well known in the art. The present improvements are shown as applied to a camera having the shutter mechanism set forth in United States Letters Patent of Rudolph Klein, No. 839,154, December 25, 1906. The accompanying drawings illustrate the "operating member", "click lever" or "trigger" 23, the pointer 41, and the index 42, bearing the letters "T", "B," and "I", indicating the positions of adjustment for the pointer 41 for time, bulb, and instantaneous exposures respectively which are set forth in said Klein patent. The shutter mechanism itself is not illustrated, being that disclosed in the said Klein patent. It suffices for an understanding of the present improvement to know that when the pointer 41 is adjusted opposite the letter "I" of the scale 42, an instantaneous exposure is made by a single movement ahead and release of the trigger 23; that when the pointer is adjusted opposite the letter "B" on the index an exposure is made by a single movement ahead and release of the trigger 23, the duration of the exposure depending upon how long the trigger is held before being released, and that when the pointer is opposite the letter "T" on the index the shutter is opened when the trigger is moved ahead and on releasing the trigger it is restored to a halfway position of rest and stays there with the shutter open until the trigger is a second time moved ahead whereupon, on releasing the trigger it is restored to its initial normal position of rest and the shutter closes. This mode of operation is a common one in cameras, the Klein patent being one illustration among others of a shutter mechanism having such a mode of operation.

In accordance with the present invention, whatever may be the adjustment of the shutter mechanism, after an exposure has been made and the trigger has resumed its normal position of rest it is locked from being again moved ahead sufficiently to actuate the shutter until the roll upon which the film is mounted is rotated so as to protect the image just taken and to expose a fresh surface of the film. The improved trigger controlling mechanism comprises the locking mechanism proper which coöperates with the trigger when the film roll is turned to expose a fresh surface of the film.

Referring to Figs. 2 and 9, the trigger 23 above referred to is made longer and narrower than those now generally in use. This is to enable it to extend through slots $a$ and $b$, on opposite sides of a housing A which incloses the locking mechanism, and is secured to the shutter support B.

The locking mechanism comprises a latch C and a strut D. The latch C is a lever pivoted at $c$, the rear locking arm of which extends across the path of the trigger 23, and the front arm of which coöperates with one end of a double-acting spring E, the other end of which is connected to the housing A through a fixed stud $d$. This spring permits the latch to be swung in both directions, and in whichever direction the latch swings the spring tends to restore it to a neutral central position illustrated in full lines in Fig. 12. The latch is maintained in its trigger locking position, illustrated in Fig. 9, by the strut D. This strut is pivoted at $e$, to the housing A and is moved to and maintained in its locking position by a spring G which is fastened at one end to a post $f$, on the housing and bears against a laterally projecting stud $g$, on the strut D near the upper end thereof. The upper end of the strut has a notch $h$, which engages the locking arm of the latch C and locks the same against downward movement, as shown in Fig. 9. When thus locked the trigger 23, if moved ahead in a downward direction encounters the latch, and is prevented from being moved far enough to permit the actuation of the shutter.

In order to move the trigger far enough ahead to release the shutter the strut must be moved out of range of the latch so that the locking arm of the latch may be swung downwardly. This unlocking movement of the strut is controlled by the rotation of the film roll through the winding key H, shown in Fig. 5. As usual in cameras this winding key has a pivoted actuating bail I, which, when not in use, is swung to the position shown in Fig. 1 where it is nested within the customary socket J. This winding bail at one end is extended to furnish a lock actuator K. When the winding bail is swung outwardly to the position shown in Figs. 4 and 5 for convenient rotation of the film roll, this lock actuator K is positioned so that on turning the winding key it finds in its path the head $i$, of a transmitter L. As shown in Figs. 4 and 5, this head $i$, of the transmitter extends through a slot $j$, in the socket J and into the path of the actuator K. This transmitter in the folding camera illustrated in the drawings comprises a rigid section $k$, and a flexible wire section $l$. This rigid section is located within a slot $m$, in the camera casing M. As shown in Figs. 1 and 6, the slot is covered by the usual leather covering $n$. A cross pin $o$ (Figs. 1 and 6) on the transmitter section $k$, prevents undue rotation of the transmitter. The lower end of the rigid section of the transmitter extends within a stationary sleeve N carried by the camera casing M, the upper end of which is closed by a screw cap O, as best shown in Fig. 10. Within this casing is a spring P surrounding the transmitter and pressing upwardly on a shoulder $p$ on the rigid section of the transmitter and acting to maintain the head $i$, of the transmitter in the path of the actuator K. The flexible section $l$, of the transmitter extends through a flexible sheath Q. At one end this flexible sheath is connected to the sleeve N and at its other end it is connected to the housing A by means of a nut R. The flexible section of the transmitter extends throughout the length of the flexible sheath Q and through the nut R and terminates within the housing A immediately beneath the outer end of a forwardly extending unlocking arm $q$ (Figs. 8 and 9) of the strut.

The mode of operation will now be readily understood. Immediately after a picture has been taken, the locking mechanism occupies the position shown in Figs. 8 and 9 in full lines in the diagram Fig. 11. In this position the strut D stands in the path of the latch C and the shutter trigger 23 is prevented from effective downward movement. In order to unlock the trigger, it is necessary to turn the winding bail I thereby winding up the film on the film roll and protecting the surface on which a picture has just been taken and presenting a fresh section of the film for the next exposure. This turning of the winding bail brings the lock actuator K against the head $i$, of the transmitter L thereby moving the transmitter lengthwise and hence swinging the strut from the position shown in Fig. 11 to the position shown in dotted lines in Fig. 12. As soon as the upper end of the strut is thus swung far enough to release the latch C, the latch is turned by its spring E to the neutral position shown in full lines in 12. In this position the rear end of the latch is below the notch $h$ of the strut as shown in Fig. 12. Accordingly, after the actuator K has passed beyond the head $i$ of the transmitter, and the spring P (Fig. 10) has restored the transmitter to its normal postion, thus freeing the strut, the spring G for the strut cannot restore the strut to its normal locking position shown in Fig. 11 because the strut encounters the locking arm of the latch, as shown in full lines in Fig. 12 and is maintained thereby in its unlocking position.

The trigger 23 is now free to be moved ahead in a downward direction. In its downward movement it first encounters the locking arm of the latch C, as shown in full lines in Fig. 12, and in its further descent it turns the latch on its pivot as indicated in dotted lines in Fig. 12, which show the trigger approaching its limit of downward movement. During this downward movement the double acting spring E is put under tension. As the trigger completes its downward movement the latch is released and is restored by the spring E to its neutral position shown in full lines in Fig. 12, or by momentum even to its locking position. If an instantaneous or bulb exposure is being made, on the release of the trigger it is restored to its normal position of rest shown in full lines in Fig. 11 by its usual restoring spring shown at 25 in the aforesaid Klein patent. This trigger restoring spring has greater force than the springs E and G. Accordingly, as the trigger in its restoring movement encounters the underside of the latch (as indicated in dotted lines in Fig. 11) it swings the latch upwardly on its pivot as indicated in dotted lines in Fig. 11 and thereby puts the spring E under opposite tension. As the locking arm of the latch is thus moved upwardly it is disengaged from the strut which is thereupon swung to its locking position (shown in Fig. 11) by its spring G. As the trigger completes its upward movement it releases the latch which is thereupon swung back by its spring E until it is stopped by encountering the notch $h$, of the strut. The trigger is thus again locked from effective movement ahead until the winding key is again turned to wind up the surface of the film which has just been exposed.

In the taking of a time exposure, with the type of camera illustrated, the trigger on its first movement ahead opens the shutter, and then swings upwardly to a halfway position of rest, approximately that indicated in dotted lines in Fig. 11. The location and arrangement of the latch is such that when the trigger occupies this halfway position it is below the latch, since the latch in its locked position is between the normal and halfway positions of rest of the trigger. Accordingly, the trigger can then be moved downwardly again to effect the closing of the shutter irrespective of whether the latch is then locked by the strut or not. It will be noted that when the trigger is moved downwardly below the rear end of the latch and the latch swings back again its momentum may carry it beyond the neutral position (shown in Fig. 12 in full lines) in which event it will be caught by the strut and locked against downward movement. But whether this locking takes place or not, in its halfway position of rest the trigger is below the latch and is free to be moved downwardly again for the purpose of closing the shutter. Then when the trigger is a second time moved ahead and released it flies up to its normal position of rest shown in full lines in Fig. 11. Accordingly, the locking mechanism acts automatically under all conditions of exposure.

The flexibility of the sheath Q and of the section $l$ of the transmitter enables the locking mechanism and the winding key control thereof to be used in connection with the well known folding type of camera which is indicated in the drawings.

We claim—

1. A photographic camera having a shutter controlling trigger which is movable once to its full extent in both directions in making bulb and instantaneous exposures and which in making time exposures is movable to its full extent ahead and is restored to a halfway position of rest in opening the shutter and then is moved ahead halfway and is restored to its normal position of rest in closing the shutter, and a winding key for the film roll, in combination with a trigger locking and unlocking mechanism comprising a housing slotted at opposite sides through which slots the trigger extends, a pivoted latch within the housing extending across the path of the trigger and in its locked position being between the normal and halfway positions of rest of the trigger, a double acting spring coöperating with the latch and acting to move it in opposite directions toward its central neutral position, a pivoted strut within the housing having a notch at one end which engages the latch to prevent effective movement thereof thereby locking the trigger against effective movement, a spring acting upon the strut to move it to locking position, an unlocking arm carried by the strut, an actuator on the winding key, a transmitter extending from the path of said actuator within the said housing and into operative relation with the unlocking arm of the strut, and a spring which restores the transmitter to its strut releasing position after the actuator has passed out of reach of the transmitter.

2. A photographic camera having a shutter controlling trigger which is movable once to its full extent in both directions in making bulb and instantaneous exposures and which in making time exposures is movable to its full extent ahead and is restored to a halfway position of rest in opening the shutter and then is moved ahead halfway and is restored to its normal position of rest in closing the shutter, and a winding key for the film roll, in combination with a trigger locking and unlocking mechanism comprising a pivoted latch extending across the path of the trigger and in its locked position being between the normal and halfway positions of rest of the trigger, and a double acting spring coöperating with the latch and acting to move it in opposite directions toward its central neutral position, a pivoted strut which engages the latch to prevent effective movement thereof thereby locking the trigger against effective movement, a spring acting upon the strut to move it to locking position, an unlocking arm carried by the strut, an actuator on the winding key, a transmitter extending from the path of said actuator into operative relation with the unlocking arm of the strut, and a spring which restores the transmitter to its strut releasing position after the actuator has passed out of reach of the transmitter.

3. A photographic camera having a shutter controlling trigger which is movable once to its full extent in both directions in making bulb and instantaneous exposures and which in making time exposures is movable to its full extent ahead and is restored to a halfway position of rest in opening the shutter and then is moved ahead halfway and is restored to its normal position of rest in closing the shutter, and a winding key for the film roll, in combination with a trigger locking and unlocking mechanism comprising a latch extending across the path of the trigger and in its locked position being between the normal and halfway positions of rest of the trigger, a double acting spring coöperating with the latch and acting to move it in opposite directions toward its central neutral position, a strut which engages the latch to prevent effective movement thereof thereby locking the trigger against effective movement, a spring acting upon the strut to move it to locking position, an actuator on the winding key, a transmitter extending from the path of said actuator into operative relation with the strut, and a spring which restores the transmitter to its strut releasing position after the actuator has passed out of reach of the transmitter.

4. A photographic camera having a shutter controlling trigger which is movable once to its full extent in both directions in making bulb and instantaneous exposures and which in making time exposures is movable to its full extent ahead and is restored to a halfway position of rest in opening the shutter and then is moved ahead halfway and is restored to its normal position of rest in closing the shutter, and a winding key for the film roll, in combination with a trigger locking and unlocking mechanism comprising a latch extending across the path of the trigger and in its locked position being between the normal and halfway positions of rest of the trigger, a double acting spring coöperating with the latch and acting to move it in opposite directions toward its central neutral position, a strut which engages the latch to prevent effective movement thereof thereby locking the trigger against effective movement, a spring acting upon the strut to move it to locking position, an actuator on the winding key, and a transmitter extending from the path of said actuator into the said housing into operative relation with the strut.

5. A photographic camera having a shutter controlling trigger and a winding key for the film roll, in combination with a trigger locking and unlocking mechanism comprising a pivoted latch extending across the path of the trigger, a double acting spring coöperating with the latch and acting to move it in opposite directions toward its central neutral position, a strut which engages the latch to prevent effective movement thereof thereby locking the trigger against effective movement, a spring acting upon the strut to move it to locking position, an actuator on the winding key, a transmitter extending from the path of said actuator into operative relation with the strut, and a spring which restores the transmitter to its strut releasing position after the actuator has passed out of reach of the transmitter.

6. A photographic camera having a shutter controlling trigger and a winding key for the film roll, in combination with a trigger locking and unlocking mechanism comprising a latch extending across the path of the trigger, a double acting spring coöperating with the latch and acting to move it in opposite directions toward its central neutral position, a strut which engages the latch to prevent effective movement thereof thereby locking the trigger against effective movement, a spring acting upon the strut to move it to locking position, an actuator on the winding key, and a transmitter extending from the path of said actuator into the said housing into operative relation with the unlocking arm of the strut.

In witness whereof we have hereunto signed our names.

JOHN F. WALL.
JOHN F. COONAN.